United States Patent [19]
Nelson

[11] 3,793,682
[45] Feb. 26, 1974

[54] DUAL ROPE CLAMP
[76] Inventor: Robert C. Nelson, 727 Heatherwood Rd., Bluefield, W. Va. 24701
[22] Filed: Oct. 2, 1972
[21] Appl. No.: 294,345

[52] U.S. Cl. ............................... 24/134 P, 198/192
[51] Int. Cl. ............................................. F16g 11/00
[58] Field of Search ........ 24/134 R, 132 R, 249 FP; 198/192; 339/274

[56] References Cited
UNITED STATES PATENTS

| | | | |
|---|---|---|---|
| 314,608 | 3/1885 | Riley | 24/134 R |
| 891,365 | 6/1908 | Pawolowski | 24/134 P |
| 948,596 | 2/1910 | Richter | 24/134 R |
| 1,149,385 | 8/1915 | Meyers | 24/134 A |
| 1,264,470 | 4/1918 | Wright | 24/134 R |
| 1,434,802 | 11/1922 | Bear | 24/134 R |
| 1,828,801 | 10/1931 | Finlayson | 24/134 R |
| 2,053,018 | 9/1936 | Bell | 24/134 R |
| 2,238,386 | 4/1941 | Frank | 24/134 R |
| 3,273,695 | 9/1966 | Hamaker | 198/192 |

*Primary Examiner*—Bernard A. Gelak
*Attorney, Agent, or Firm*—Davis, McCaleb & Lucas

[57] ABSTRACT

Rope clamp optionally usable on one or another standard size of wire rope to attach a conveyor roller assembly or supporting stand. An elongated plate has a lateral flange providing an L-cross-section angle bracket with a rope-receiving bight extending along the inner corner. A cable-locking dog member is rotatably supported on the inside of the plate and connected to an external lever. The locking dog member has a pair of diametrically opposed cam surfaces and is eccentrically mounted in such a way that one of the cam surfaces is offset from the axis of rotation more than the other cam surface. A third peripheral surface intermediate the cam surfaces is spaced from the axis of rotation a lesser distance than either of the cam surfaces, the latter being inclined to crowd rope into the bight. The lever has two 180°-displaced operating positions lengthwise of the bracket. One diameter of wire rope can be clamped by moving the lever to one of these operating positions, and a different diameter wire rope can be clamped by moving the lever to the other operating position. The clamp is specifically described for rope sideframe conveyors where current practice has standardized on either ¾ inch or ⅝ inch diameter wire rope depending on the size of conveyor and service requirements.

7 Claims, 9 Drawing Figures

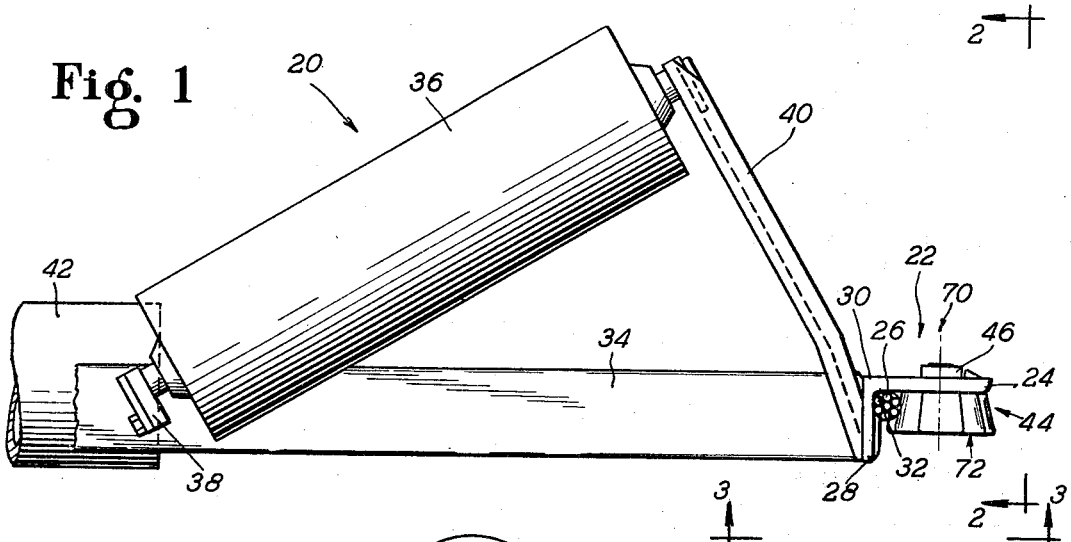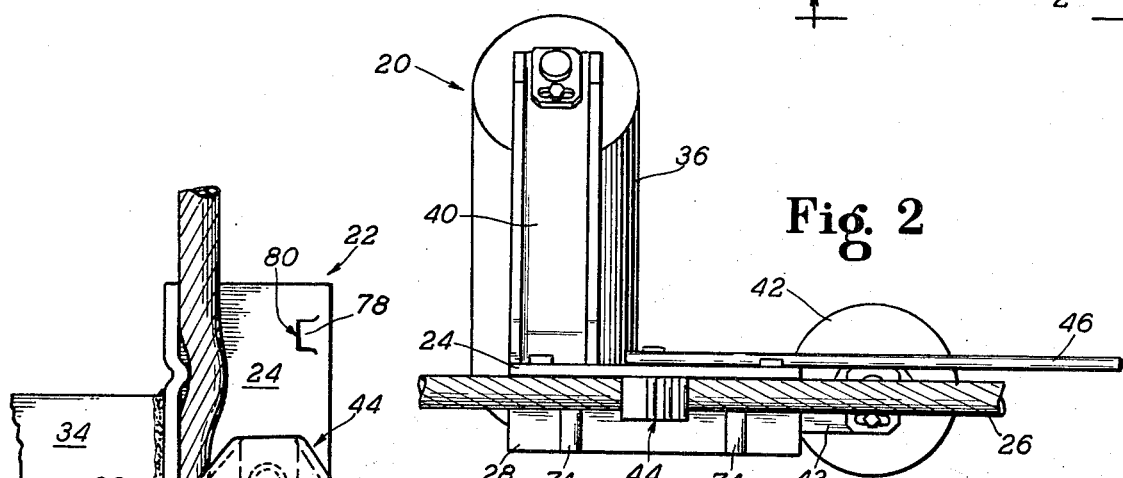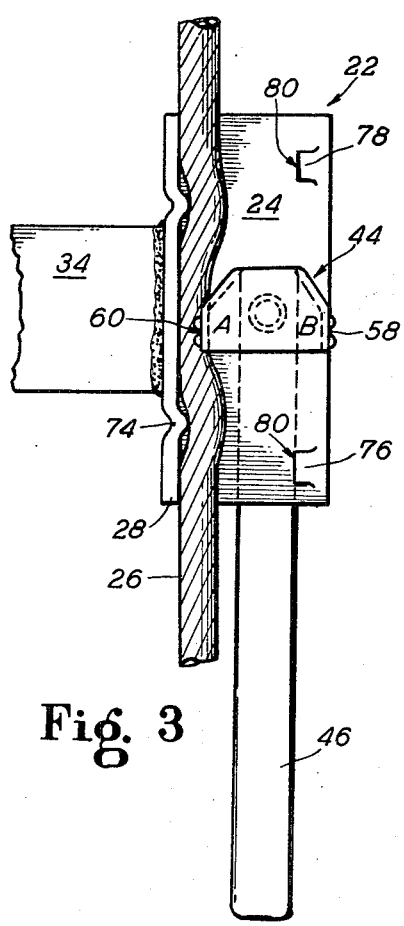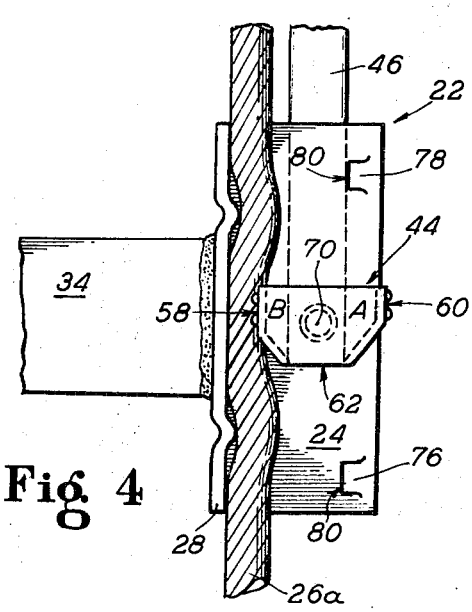

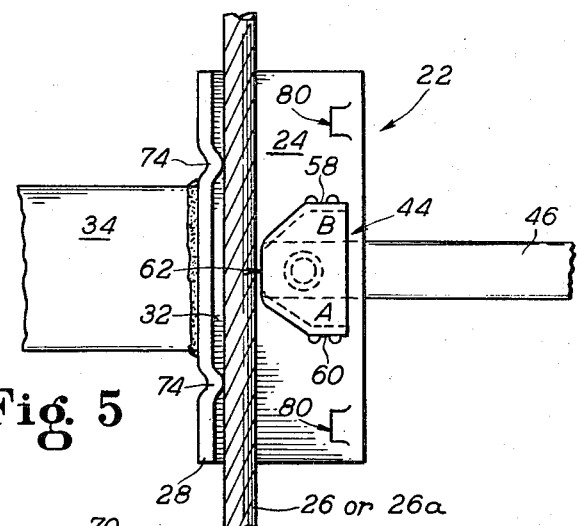
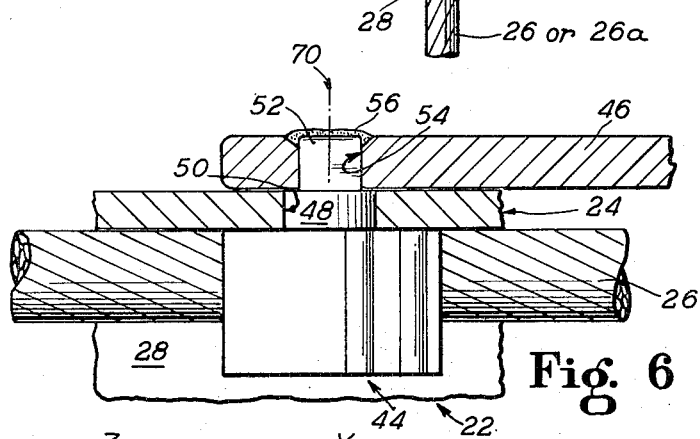
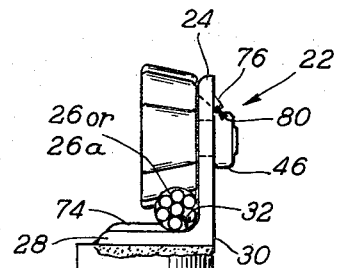
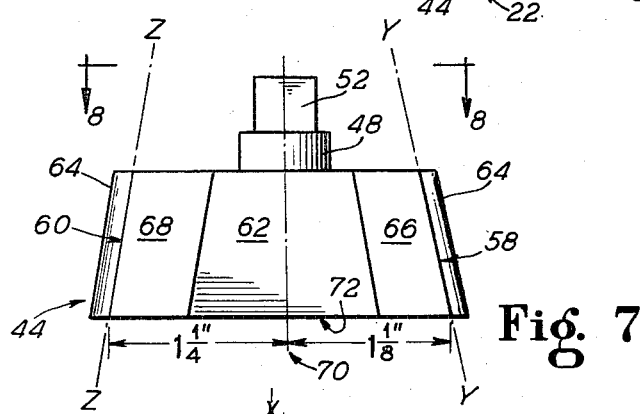
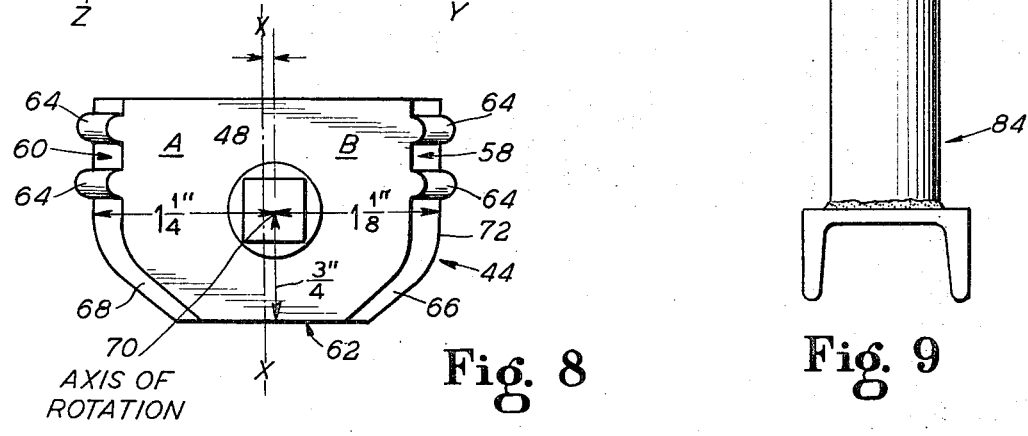
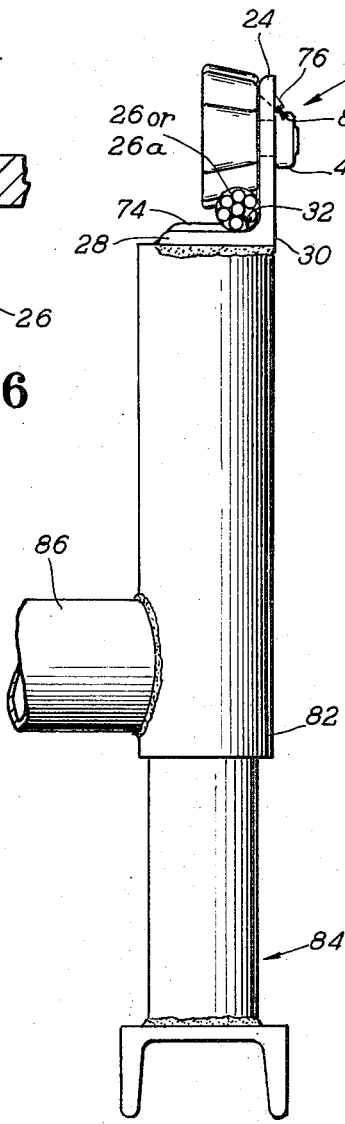

DUAL ROPE CLAMP

BACKGROUND OF THE INVENTION

Since about 1957, rope sideframe conveyors have been used extensively, particularly in underground mines. This type of conveyor is characterized by side frames consisting of two parallel wire ropes maintained under tension by anchors at their ends and supported at a desired working height either by stands extending up from the floor or by chains depending from the roof. Troughing idler assemblies are supported across the wire ropes at intervals along the conveyor, and return idlers are supported either on the wire ropes or on ground-engaging stands. An orbitally movable endless belt has its carrying run supported on the troughing idler assemblies and its return run supported on the return rollers.

In mine service the amount of coal or ore carried varies widely between fully-loaded and empty conditions. The load varies substantially and frequently especially near a mine face where mined material is being produced or transported by intermittent operating equipment.

A unique characteristic of the rope sideframe type conveyor is that the ropes are constantly shifting longitudinally under the changing loads referred to above. In addition, they bounce up and down under the changing loads and even shift sidewise but usually to a lesser extent. Troughing idler assemblies, and return rollers where they are suspended from the ropes, are in a constant state of motion, up and down, sidewise, and longitudinally with the shifting ropes. Floor stands tilt back and forth with longitudinal movement of the ropes, and roof supporting chains do the same as well as shift sidewise.

It is extremely important that these components be locked to the ropes, even though they move with them. If the troughing idler assemblies or return rollers loosen and slip along the ropes, one side more than the other, they will skew and cause the belt to run off one side requiring costly shut down of the conveyor to re-align it. Where slippage of the rope occurs at the supporting stands, this can result in such severe tilting that the stands will fall over.

Conveyor designers have spent a great deal of effort developing rope clamps for this service, at least two dozen patents having been awarded to the major conveyor manufacturers in the last 15 years, but prior to the present invention no one has developed a rope clamp which is completely satisfactory for this service, expecially now that clamps must be effective and reliable on either ¾ inch or ⅝ inch diameter wire ropes which have become the two sizes now standardized as stated above. As shown in Craggs et al. U.S. Pat. No. 2,773,257 issued Dec. 4, 1956, the first rope sideframe conveyor had U-shaped brackets and small railway-type spikes or wedges to secure troughing roller assemblies and supporting stands to the ropes. Later, angle brackets with U- or J-bolts were tried as shown in LoPresti et al. U.S. Pat. No. 2,875,886. Set screws forced into the strands of the ropes have also been tried without much success.

As will be appreciated by those who work regularly with these conveyors, the U-shaped brackets with railway spikes or wedges were not entirely satisfactory although they were widely used before certain limitations were fully appreciated. They required a hammer to drive the spike or wedge in place. If not driven tightly enough, the component would slip on the rope, and if driven too tightly, the rope strands could be damaged. The U- and J-bolts and set screws required a special wrench, often unavailable when and where needed. They permanently damaged or deformed the ropes if pulled up too tight, they involved a lot of loose hardware, such as bolts, nuts, lock washers, etc. that were easily lost in the dust and cuttings on the mine floor, and sizes made for ¾ inch diameter rope were not easily usable on ⅝ inch rope and vice versa.

BRIEF SUMMARY OF THE INVENTION

An object of the present invention is to provide a dual rope clamp especially useful in rope sideframe conveyors consisting of a single unitary assembly which can be placed on a wire rope and locked positively in place by moving a locking lever to one longitudinal, out-of-the-way position for ¾ inch diameter rope and to the opposite longitudinal position for ⅝ inch diameter rope; and which can be released by moving the lever to a lateral position to disengage the rope.

Another object is to provide a dual rope clamp for optional use on either of a pair of discretely-sized wire ropes of different diameters, and which is simple and reliable and easy to use, and can be manufactured at low cost.

BRIEF DESCRIPTION OF THE DRAWINGS

FIG. 1 is a fragmentary view of a troughing idler assembly for a rope sideframe conveyor illustrating one application of the dual rope clamp of the present invention;

FIG. 2 is a view of FIG. 1 as seen in the direction of the arrows 2—2;

FIG. 3 is a fragmentary view of FIG. 1 seen in the direction of the arrows 3—3 and showing the dual rope clamp in one operating position for locking a ⅝ inch diameter rope;

FIG. 4 is a view similar to FIG. 3 but showing the dual rope clamp in another operating position for locking a ¾ inch diameter rope;

FIG. 5 is a view similar to FIGS. 3 and 4 but showing the clamp in a released position;

FIG. 6 is a fragmentary enlarged view of FIG. 2;

FIG. 7 is an enlarged view of the locking dog member of the clamp, in the position that the dog member is shown in FIG. 1;

FIG. 8 is a plan view of FIG. 7; and

FIG. 9 is a fragmentary view of a ground supporting stand of a rope sideframe conveyor illustrating another application of the dual rope clamp of the present invention.

Like parts are referred to by like reference characters throughout the figures.

DETAILED DESCRIPTION OF THE PREFERRED EMBODIMENT

The numeral 20 refers generally to a troughing idler assembly having a dual rope clamp in accordance with the present invention at each end. The dual rope clamp is general designated 22 and only one is shown in FIG. 1.

The dual rope clamp 22 comprises an elongated plate 24 which extends lengthwise along the wire rope sideframe 26 of a rope sideframe conveyor. A flange 28 extends along the inner edge 30 of the plate 24 and provides a rope engaging bight 32 extending along that edge.

The troughing idler assembly 20 is shown merely by way of illustration and environment. The details comprise no part of the present invention, so it will be described only generally. It comprises a transverse strut 34, which may be a square tube, welded at each end to one of the flanges 28. Other shapes of transverse supporting members may be used, and there may be more than one. An inclined wing roll 36 is supported on brackets 38 and 40 which are mounted on the front side of the transverse strut 34 as shown in FIG. 1. On the back side of the strut, and fastened by brackets not shown, is a horizontal center roll 42.

Returning now to the dual rope clamp, a locking dog member is mounted on the under side of plate 24 as shown in FIGS. 1 and 2, and a manually operable lever 46 is mounted on the top side, these being fastened respectively on opposite ends of a pin 48 (FIGS. 6-8) which is rotatably journaled in an opening 50 in plate 24. The pin 48 may be integral with the locking dog member 44, and it may have a square end portion 52 fitted into a square opening 54 in lever 46 and the lever may be welded to the end of the pin as shown at 56 in FIG. 6.

To facilitate the description, some specific dimensions for the locking dog member will now be given where the dual rope clamp is made for optional use on ¾ inch diameter or ⅝ inch diameter wire rope. ⅝ inch diameter wire rope is indicated by the numeral 26, and ¾ inch wire rope is indicated by the numeral 26a. It will be obvious that the invention may be applied to other specific sizes of wire ropes, and no limitation of this invention to the specific sizes illustrated and described is intended.

The locking dog member 44 has diametrically opposed peripheral first and second cam surfaces 58 and 60, respectively. These are parallel to the center line X—X and, except for indentations made in the wire rope by raised ribs 64, they provide substantial flatwise engagement along the length of a portion of wire rope in the bight 32. There is a peripheral third surface 62 intermediate the two cam surfaces 58, 60. As shown in FIG. 8, the surface 62 is flat and in a transverse plane which is at right angles to the center line X—X.

As shown in FIG. 7, each of the flat cam surfaces 58 and 60 is inclined in an angular plane which, if extended, would intersect the axis of rotation on the lever side of the plate 46. Specifically, cam surface 58 is in such an inclined plane Y—Y and cam surface 60 is in such an inclined plane Z—Z. As will be seen, this angular inclination crowds the wire rope into the bight 32 and holds the clamp firmly onto the rope when the lever is in either of its clamped, operating positions.

Diagonal corner surfaces 66 and 68 respectively connect the cam surfaces 58 and 60 with the third surface 62.

As shown in FIG. 8, the axis of rotation 70 of the locking dog member is eccentric, being offset one-sixteenth inch to the right of the center line X—X. This divides the dog member into sections designated A and B for easy identification in the smaller scale FIGS. 3-5. As shown in FIG. 8, the first and second cam surfaces are at different distances from the axis of rotation 70. Specifically, cam surfaces 58 and 60 are respectively 1⅛ inches and 1¼ inches from the axis 70, measured at the widest end surface 72. The peripheral third surface 62 is three-fourths inch from the axis of rotation 70, a lesser distance than either of the cam surfaces 70.

The flange 28 is indented on opposite sides of the locking dog member to provide rope-engaging ribs 74, which cooperate with the ribs 64 on the locking dog member to hold rope against slippage through the clamp.

Detent means is provided, acting between the lever 46 and plate 24 to facilitate holding the lever in either of the locked, operating positions of FIGS. 3 and 4. Specifically, this comprises a pair of punched indentures 76 and 78 having outer edges 80 engageable with one side or the other of lever 46. The clearance between pin 48 and plate opening 50, and the end play of the pin within that opening, combined with inherent flexibility of lever 46 and proper sizing of the indentures 76 and 78, enables the lever 46 to be moved to either of the locked positions shown in FIGS. 3 and 4, and to be released therefrom simply by pulling the lever slightly outwardly to disengage it from the detent surfaces 80.

Use and operation of the invention when employed with a troughing idler assembly as shown in FIGS. 1-8 are as follows.

Both dual rope clamps 22 at the opposite ends of the troughing idler assembly 20 will be released by swinging the levers 46 to the transverse position shown in FIG. 5. Each clamp is then assembled onto a wire rope having either a ⅝ inch or ¾ inch diameter. If it is a ⅝ inch rope as designated 26 in FIG. 3, the handle 46 will be swung to the longitudinal operating position shown in that figure with inclined cam surface 60 of the locking dog member pressing the rope firmly into the bight 32. If it is a ¾ inch rope as designated 26a in FIG. 4, the handle 46 will be swung to the longitudinal operating position shown in that figure with inclined cam surface 58 of the locking dog member pressing the rope firmly into the bight 32.

FIG. 9 illustrates another application of the dual rope clamp 22 in the field of rope sideframe conveyors. There the clamp 22 is shown welded to the top end of an upright leg 82 of a stand 84, it being understood that each stand has a pair of upright legs 82 connected by a spacer 86. Note in FIG. 9 that the lever 46 is operable in a vertical plane instead of a horizontal plane, otherwise it is identical to the clamp described in connection with FIGS. 1-8.

While a specific embodiment of the invention has been described, it will be apparent to those skilled in the art that other specific constructions and arrangements are possible within the scope and spirit of the invention as covered by the following claims. It is emphasized that the specific dimensions of the locking dog member and the ropes are given merely by way of illustration to facilitate the description, and the invention is not to be limited to those inventions.

I claim:

1. A rope clamp comprising:
    an elongated plate having a flange along one edge directed laterally from one side of said plate to provide a rope-engaging bight extending along said edge at the junction of said plate and flange; and
    a rope locking dog member on said one side of said plate and a manually operable lever on the opposite side, said locking dog member and lever being fastened respectively on opposite ends of a pin rotatably supported in said plate;

said locking dog member having diametrically opposed peripheral first and second cam surfaces at different distances from the axis of rotation enabling each different said cam surface to lock a different sized rope against said bight when rotated to face said bight, said locking dog member having an intermediate peripheral third surface at a lesser distance from said axis of rotation than either of said cam surfaces enabling said locking dog member to release a rope locked by either of said cam surfaces when rotated to cause said third surface to face said bight;

each of said cam surfaces being inclined in an angular plane intersecting said axis of rotation on said opposite side of said plate, and thereby effective to crowd a rope inward against said plate and bight in response to rotation of said cam surface against the rope.

2. A rope clamp according to claim 1 in which detent means is provided between said lever and plate to lock said lever selectively in either of two 180° displaced positions, and movement of said lever to either of said positions tends to increase the crowding effect of a respective one of the inclined cam surfaces against the rope.

3. A rope clamp according to claim 1 in which transverse raised ribs are provided on the rope-engaging portions of said cam surfaces and said flange to facilitate selectively locking ropes against longitudinal slippage relative to said clamp.

4. A rope clamp according to claim 1 in which said lever is disposed in 180° displaced positions lengthwise of said plate when said locking dog member is in positions locking said first and second cam surfaces against ropes in said bight.

5. A rope clamp according to claim 4 in which detent means is provided between said lever and said plate to lock said lever selectively in either of said 180°-displaced positions.

6. A rope clamp according to claim 5 in which said detent means includes a raised element on either of said lever and plate engageable with the other of said lever and plate.

7. A rope clamp according to claim 1 in which each of said peripheral first and second cam surfaces is flat and extends along a line enabling flatwise engagement with a rope in said bight.

* * * * *